United States Patent [19]

Weerth

[11] Patent Number: 4,744,129

[45] Date of Patent: May 17, 1988

[54] HOLDING DEVICE

[75] Inventor: Hans-Ernst Weerth, Ränkle, Fed. Rep. of Germany

[73] Assignee: Albert Handtmann Maschinenfabrik GmbH & Co. KG, Biberach an der Riss, Fed. Rep. of Germany

[21] Appl. No.: 3,797

[22] Filed: Jan. 16, 1987

[30] Foreign Application Priority Data

Jan. 31, 1986 [DE] Fed. Rep. of Germany ....... 3603001

[51] Int. Cl.$^4$ .............................................. A22C 11/10
[52] U.S. Cl. ........................................... 17/33; 17/34; 17/41
[58] Field of Search ..................... 17/35, 41, 49, 33, 34

[56] References Cited

U.S. PATENT DOCUMENTS

| | | | |
|---|---|---|---|
| 3,950,821 | 4/1976 | Plewa | 17/41 |
| 4,669,149 | 6/1987 | Kawai et al. | 17/41 X |
| 4,675,945 | 6/1987 | Evans et al. | 17/41 X |

*Primary Examiner*—Willie G. Abercrombie

*Attorney, Agent, or Firm*—Finnegan, Henderson, Farabow, Garrett & Garrett

[57] ABSTRACT

A holding device which is adapted to be flanged to a machine for filling and for automatically twisting off sausages and which acts on the front end of a twist-off nozzle of the machine via a brake ring housing for effecting automatic twisting off. For providing, on the one hand, a possibility of exactly positioning the holding device relative to the twist-off nozzle and for maintaining, on the other hand, the twist-off nozzle in a condition in which it is always accessible for the purpose of fitting new caterpillar sausage skins, the holding device is provided with a support tube, which is supported in a guide link in a manner free from play and which permits the brake ring housing of the holding device to be pivoted away in the case of a movement taking place in the horizontal direction of a pivotable lever, said support tube having, in addition, the effect that the position which has once been adjusted is reestablished when the brake ring housing is pivoted back.

13 Claims, 3 Drawing Sheets

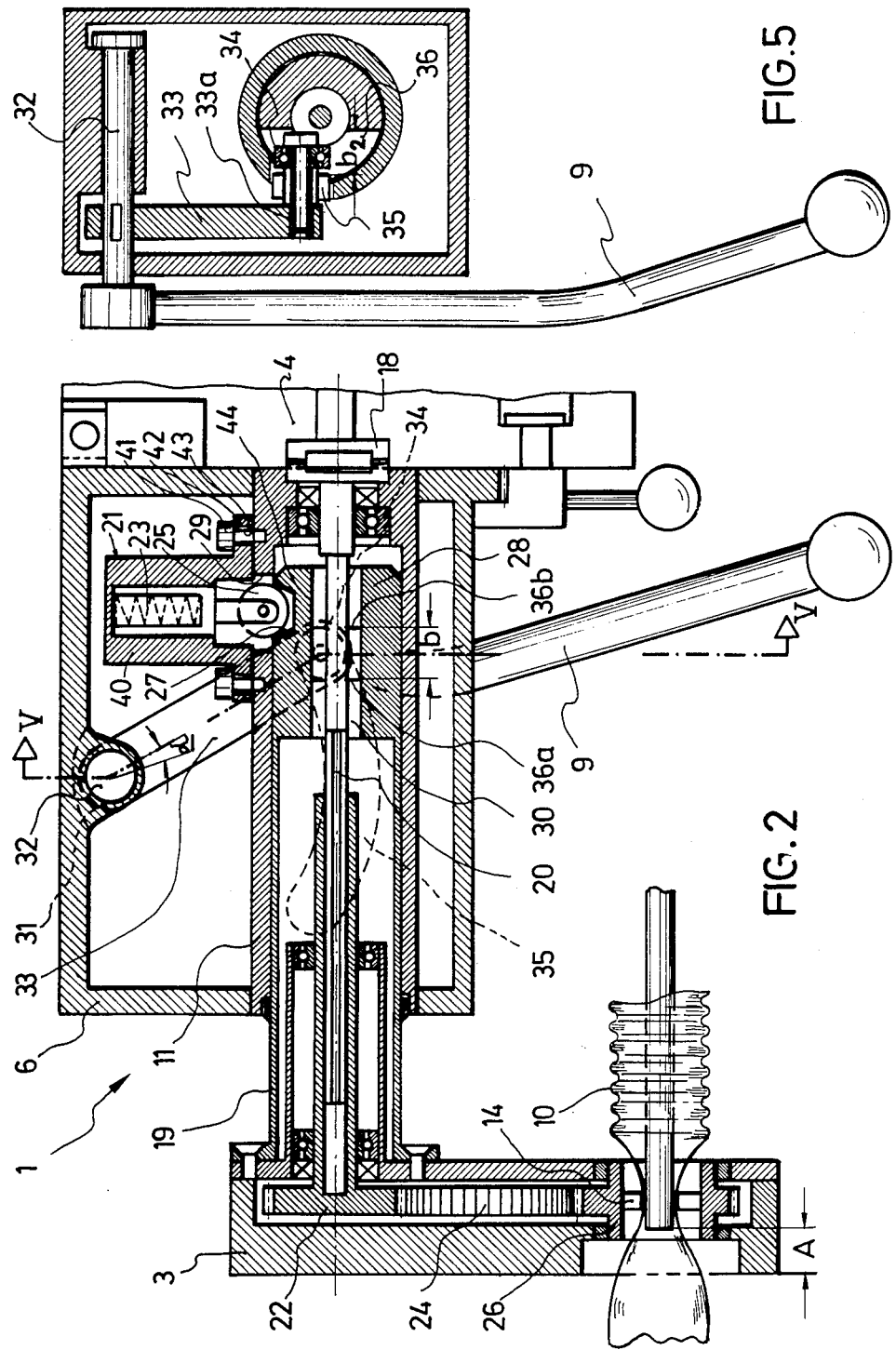

HOLDING DEVICE

BACKGROUND OF THE INVENTION

The present invention refers to a holding device adapted to be flanged to a machine for filling and for automatically twisting off sausages and provided with a brake ring housing which is secured to a support tube guided in a guide tube and which encloses the free end of a twist-off nozzle of the machine in its operation position, said brake ring housing being adapted to be pivoted away from said operation position, in response to actuation of a pivotable lever action on the guide tube, in such a way that the free end of the twist-off nozzle is freely accessible.

Such a holding device is known in the prior art. A holding device of this type permits an automatic performance of the twist-off operation when individual portions are being filled into sausage skins. In a machine for filling and for twisting off sausages, the twist-off gear means is normally located on the front side of the machine, and the twist-off nozzle projects horizontally from said twist-off gear means. This twist-off nozzle has fitted thereon the caterpillar sausage skin for the purpose of filling, said caterpillar sausage skin being subsequently withdrawn gradually during the filling and twist-off operation.

In the operating position, the holding device encloses the free end of the twist-off nozzle with the brake housing.

In view of the fact that the brake ring housing must enclose the free end of the twist-off nozzle in the operating position so that the braking effect can be produced, said free end of the twist-off nozzle is not freely accessible in this operating position. Hence, there must be a possibility of pivoting away the brake ring housing for the purpose of fitting on new caterpillar sausage skins. There must be a possibility of doing this as simply and as rapidly as possible so that the filling rates of such machines, which are, in principle, extremely high are not rendered useless.

For the purpose of fitting on a new caterpillar sausage skin, the brake ring housing must first of all be adapted to be displaced axially so that the free end is no longer enclosed by the contour of said brake ring housing, and, subsequently, a pivotal angular displacement must be effected so that the free end of the twist-off nozzle is exposed.

In order to achieve this, the measure of supporting and guiding the support tube such that it is adapted to be longitudinally displaced relative to a guide tube with the aid of sliding springs is known from the prior art. The drive of the support tube and, consequently, also of the brake housing for longitudinal displacement is effected via a pivotable lever, which is adapted to be pivoted in a vertical plane and which carries a gear engaging a support tube portion constructed as a rack.

This displacing movement is carried out in the longitudinal direction of the support tube for such a distance that the free end of the twist-off nozzle is no longer enclosed in the contour of the brake ring housing. Measures are then taken, which permit that the brake ring housing can be pivoted aside by hand.

It is essential to the function of such a holding device that, in the operating position of the brake ring housing, said brake ring housing can be secured in position in the longitudinal direction and, relative to the twist-off nozzle, such that it extends parallel to the axis of said twist-off nozzle in an extremely exact manner so that the brake can precisely cooperate with the free end of the twist-off nozzle.

The hitherto known axial displacement guide means, which employ sliding springs, turned out to be still in need of improvement with regard to exact positioning of the support tube and with regard to a displacement of the support tube in a manner free from play.

Hence, the present invention is based on the task of improving a holding device of the type mentioned at the beginning with regard to the ease of handling and with regard to the positioning accuracy of the brake ring housing relative to the twist-off nozzle.

SUMMARY OF THE INVENTION

In the case of a holding device of the type mentioned at the beginning, this task is solved by the features that the guide tube is provided with a guide link engaged by at least two guide elements which are displaced relative to each other and adjustably secured to the support tube in such a way that one guide element is guided in a manner free from play on one guide edge of the link and that the other guide element is guided in a manner free from play on the opposite guide edge of the link, and that a first section of the guide link is constructed such that the support tube carries out a longitudinal displacement movement relative to the guide tube, and that a second section of the guide link is constructed such that the support tube carries out a combined longitudinal and pivotal displacement movement relative to the guide tube.

On the basis of this solution, the support tube carrying the brake ring housing is guided relative to the guide tube in a manner free from play. The cooperation of the two guide elements with the link guide means guarantees that, when an operation of pivoting away has taken place, the support tube in the operating position will return the brake ring housing in an extremely precise and consistently accurate manner to the previously adjusted location of the operating position. The subdivision of the link guide means into a parallel extending section, in which only a longitudinal displacement is effected, and into a curved section, in which a combined longitudinal and pivotal displacement movement of the brake ring housing is achieved, provides the possibility of displacing by means of the pivotable lever along the brake ring housing away from the operating position into the removed position and vice versa, without any additional manipulation being necessary e.g. for pivoting the brake ring housing away.

It follows that this automatic pivoting away with the aid of the pivotable lever permits a faster operation of the machine. When a new caterpillar sausage skin has been fitted on, the brake ring housing is then automatically and exactly returned, by a single manipulation, to its adjusted position relative to the free end of the twist-off nozzle, where it is positioned accurately.

In accordance with an advantageous further development of the invention, there is provided an arresting means with the aid of which the support tube is secured against longitudinal displacement in the operating position. This arresting means can, for example, consist of a pressure roll which is acted upon by a soring and which, in the operating position, engages a complementary snap-in groove formed on the support tube. With the aid of such an arresting means, the support tube is automatically and exactly secured against longitudinal displacement as well as fixed in the operation position of the brake ring housing. The fixing with the aid of a pressure roll is effected automatically, without any manipulation being necessary for this purpose.

In accordance with an advantageous further development, the feature is provided that the pressure roll is adapted to be displaced in the longitudinal direction. This can, for example, be achieved by arranging the pressure roll in a roll holding means which is adapted to be longitudinally displaced on the guide tube. This structural design provides a simple possibility of adjusting the axial position of the brake ring housing relative to the free end of the twist-off nozzle in a precise and uncomplicated manner.

A further embodiment of the present invention provides the feature that rolls are used as guide elements. The rolls provide the advantage that they permit a displacement of the support tube relative to the guide tube in the case of which very low friction occurs and which, consequently, can be carried out smoothly. In order to be able to effect an exact adjustment, the rolls can be supported on a bearing bolt with adjustable eccentricity. This can be effected e.g. on the basis of an arrangement in the case of which the bearing bolt extends through the inner ring of the roll bearing means with a certain amount of play and in the case of which the head of said bearing bolt acts on the inner ring when screwed in. It is thus possible that, prior to screwing on the bearing bolt, the roll is brought into abutting contact with the associated guide edge of the link in such a way that the desired position of the brake ring housing relative to the twist-off nozzle is obtained. It follows that, in combination with the adjustable arresting possibility in the longitudinal direction, it is also possible to adjust the position transversely to the longitudinal axis of the twist-off nozzle in a precise and simple manner.

A further advantageous embodiment of the invention provides the feature that the guide tube has provided therein an opening having the shape of a circular arc segment and extending concentrically with a bearing bolt which is arranged outside of the guide tube and which has attached thereto, in a manner preventing relative rotation to said bearing bolt, the pivotable lever and a shorter arm acting on the support tube. Due to this type of transmission of the movement employing lever transmission from the pivotable lever to the shorter arm, which then acts on the support tube, it is achieved that the actuation force which is effective when the holding device is pivoted away, and in the opposite direction, is small. On the basis of the opening which is provided in the guide tube and which has the shape of a circular arc segment, it is possible to effect transmission of the drive to the support tube through the guide tube with the aid of the shorter arm.

In this connection, it will additionally be advantageous when the bearing bolt for the pivotable lever is supported on a housing of the holding device such that it extends vertically. Hence, the bearing bolt is arranged at the largest possible distance from the guide tube and support tube, respectively, and this has the consequence that the circular arc segment-shaped opening can have a comparatively flat configuration, said configuration being advantageous with regard to a small actuating force for the pivotable lever.

In accordance with a further embodiment of the invention, the bearing bolt is directed vertically and the pivotable lever is pivoted in the horizontal plane. Due to this measure, the pivotable lever can be actuated by the operator in an ergonomically advantageous manner. The pivotal movement takes place in the horizontal plane in this case. This has the consequence that, in spite of a comparatively great length of the pivotable lever, which is e.g. three times as long as the shorter arm, said pivotable lever does not impede the attachment of a work table or the like for receiving the sausages which have been filled and twisted off.

In accordance with an advantageous further development, the transmission of the pivotal movement of the pivotable lever by means of the shorter arm acting on the support tube is effected on the basis of an arrangement in the case of which the free end of the shorter arm carries a sliding roll, which, through the opening, engages a groove extending perpendicular to the longitudinal axis of the support tube. The roll, which, during the pivoting operation, moves up and down (depending on the direction of pivoting) in the thus provided perpendicularly extending groove, abuts during said movement either on the front or on the rear boundary wall of the groove—depending on the direction of pivoting—for the purpose of transmitting the drive. In order to permit a rolling movement of the sliding roll in the groove in both directions without any hindrance, the groove, when seen in the longitudinal direction of the support tube, is slightly broader than the diameter of the sliding roll. In this connection, it will also be advantageous when the width of the groove in the radial direction of the support tube exceeds the width of the sliding roll to such an extent that the support tube can be pivoted by the desired distance without any abutting contact being established between the inner wall of the groove and the sliding roll.

In order to be able to form the guide elements, the groove for the sliding roll of the shorter pivot arm and also the snap-in groove on the support tube, a further development of the invention provides the feature that the support tube is provided with a solid structural design towards the end facing away from the brake ring housing. In said solid part, the respective grooves and also the support of the guide elements can be provided and effected, respectively, in a sufficiently solid manner.

DESCRIPTION OF THE DRAWINGS

In the following, the invention will be further explained and described on the basis of the embodiment shown in the drawing, in which FIG. 2 shows a section through the holding device approximately along the line II—II of FIG. 1, FIG. 5 shows a section through the holding device along the line V—V of FIG. 2, the rollers guided in the link being omitted in this figure.

DETAILED DESCRIPTION OF THE INVENTION

Figure 1:
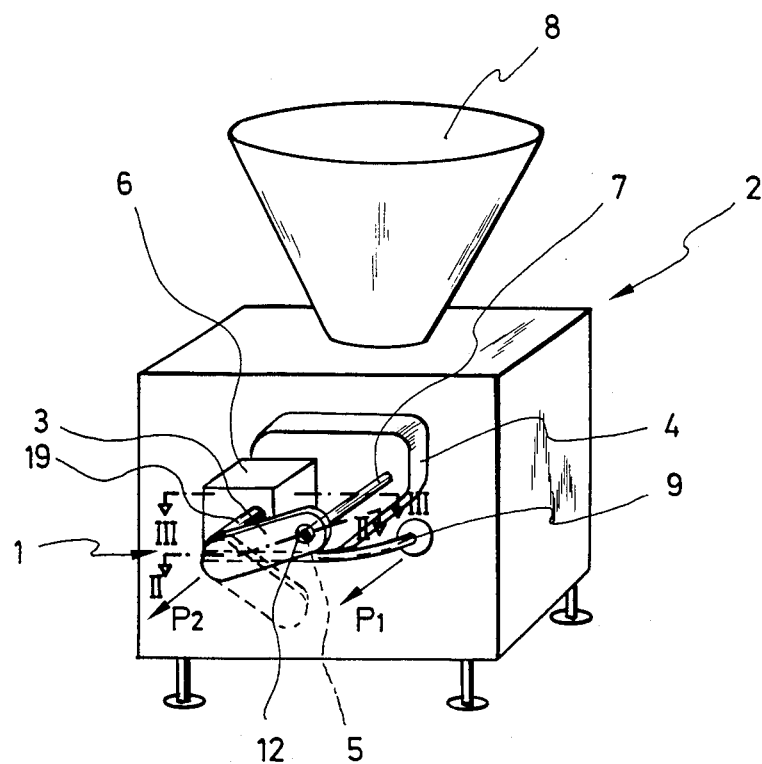
FIG. 1 shows a perspective, schematic view of a sausage filling machine with a holding device constructed and arranged in accordance with the invention.

On the basis of FIG. 1, the task and the fundamental function of the holding device according to the invention is to be explained first. In FIG. 1, reference numeral 2 refers to a machine, as a whole, used for filling and for automatically twisting off sausages.

The machine is supplied with sausage meat via a feeding funnel 8, and, with the aid of means which are not shown in detail, said sausage meat is then ejected through the twist-off nozzle 7 to apportion it and to fill it into sausage skins. For the purpose of filling the sausage meat into sausage skins, a caterpillar sausage skin 10 (of FIG. 2) is fitted onto the twist-off nozzle from the front free end 5 of said twist-off nozzle 7. When an adjusted portion has been ejected, the twist-off nozzle 7 is rotated about its own axis by a twist-off gear means arranged within the housing 4 so as to obtain a constriction of the dedicated portion. In order to carry out this filling and twist-off operation in a fully automatic manner, the holding device, which is arranged on the machine and which, as a whole, is referred to by reference numeral 1, is provided. The holding device 1 is provided with a brake ring housing 3, which, in the operating position shown by solid lines in FIG. 1, encloses the free end 5 of the twist-off nozzle in a passage opening 12. Within said passage opening 12, the brake ring housing 3 is equipped with a brake ring 14, which slightly slows down the withdrawal movement of the caterpillar sausage skin 10 during the filling operation and which thus provides the necessary tension of the sausage skin to be filled. In order to avoid that the twist-off nozzle slips in the course of the twist-off operation without entraining the sausage skin, said brake ring 14 is additionally adapted to be driven with the aid of a gear means through the brake ring housing and the holding device, said driving being effected at the speed of rotation of the twist-off nozzle 7, it follows that, while the twist-off nozzle is carrying out the rotary movement within the sausage skin, the sausage skin is seized from outside by the brake ring and is thus reliably twisted off in synchronism with the rotary movement of the twist-off nozzle.

An extraordinarily precise and exact positioning of the brake ring around the free end 5 of the twist-off nozzle is necessary in order to achieve that the brake ring slows down the withdrawal movement of the caterpillar sausage skin on the one hand, but does not jam said sausage skin on the other, and that, in addition, said brake ring can help to twist off the sausage skin from outside during the actual twist-off operation.

On the other hand, however, there must be a possibility of supplying new caterpillar sausage skins in the front end 5 of the twist-off nozzle 7 every now and then. Hence, it must be possible to displace the brake ring housing from the operating position in such a way that new caterpillar sausage skins can be fitted without any hindrance. It must, however, also be possible to return the brake ring housing to its operating position in a simple manner and with exact positioning, when the fitting operation has been carried out. The present invention permits this in the manner which will now be described in detail hereinbelow.

By means of the present invention it is possible that, by pivoting the pivotable lever 9 in a horizontal plane in the direction of the arrow $P_1$, a support tube 19 is first pushed out of the housing 6 of the holding device 1 in a longitudinal displacement movement in the direction of the arrow $P_2$, which has the effect that the brake ring housing 3 is displaced relative to the free end 5 of the twist-off nozzle 7 in such a way that this end is now exposed. Then a downward pivotal movement of the support tube 19 and, consequently, of the brake ring housing 3 into the position shown in FIG. 1 by a broken line is achieved by further pivoting of the pivotable lever 9 in the same plane $P_1$. When the pivotable lever is pivoted in a direction opposite to the direction of the arrow $P_1$, these processes take place the other way round.

The horizontal section in FIG. 2 shows details of the holding device 1 according to the invention. As can be seen in said figure, the holding device housing 6, which is adapted to be flanged onto the twist-off gear means in housing 4, has provided therein a guide tube 11 within which the support tube 19 is guided in a slidably displaceable manner. The support tube 19 carries at its front end, which projects from the housing 6, the brake ring housing 3 such that said brake ring housing cannot rotate. Drive of the brake ring 14 is effected from the twist-off gear means via the coupling means 18, the profile shaft 20 extending through the support tube 19, the gear 22, the intermediate gear 24 and the gear 26. The profile shaft 20 is received, in a longitudinally displaceable manner, in a correspondingly formed lengthening piece 22a of the gear 22 so that the support tube 19 can be longitudinally displaced without releasing the driving connection.

The support tube end 28 facing the housing is provided with a solid structural design with the exception of a central hole 30 through which the profile shaft 20 passes. This solid part of the support tube 19 is used for effecting the drive and the guidance during displacement. As can be seen from FIG. 2 in connection with FIG. 5, a bearing means 31 for a bearing bolt 32 is provided within the housing 6 at a location remote from the support tube 19 and the guide tube 11. The pivotable lever 9 and a shorter arm 33, which is positioned within the housing, are attached to said bearing bolt 32 such that they are secured against rotation relative thereto. The articulation is effected in such a way that the shorter arm defines with the pivotable lever an acute angle $\alpha$. The free end 33a of the shorter arm 33 carries a sliding roll 34. Through an opening 35, which is provided in the wall of the guide tube 11 and which has the shape of a circular arc segment, the sliding roll engages a groove 36 extending transversely to the longitudinal axis of the support tube 19. As can be seen in FIG. 5, the groove extends essentially over the diameter of the solid part of the support tube 19. When seen in the longitudinal direction, the groove has a width b (cf. FIG. 1), which is slightly greater than the diameter of the sliding roll 34. When a pivotal movement is effected by means of the pivotable lever 9, the sliding roll—depending on the direction of pivoting—either moves along one boundary wall 36a of the groove, or, in the case of a movement in the opposite direction of pivoting, it moves along the boundary wall 36b, and, consequently, said sliding roll transmits the driving force to the support tube 19 in the respective directions. The width b2 in the radial direction of the groove is dimensioned such that sufficient space remains so that the support tube can carry out a pivotal movement without impairing in any way the sliding roll.

Figure 4:
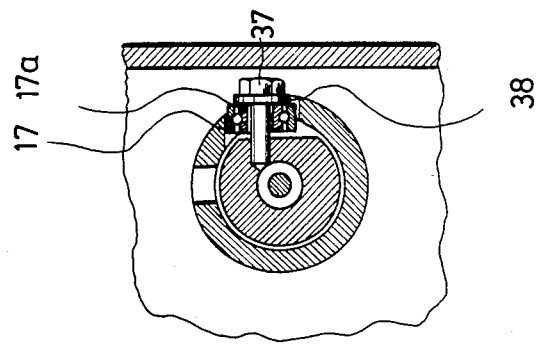
FIG. 4 shows in detail the support of a guide element in a cross-sectional representation through the support tube and the guide tube along the line IV—IV of FIG. 3.
Figure 3:
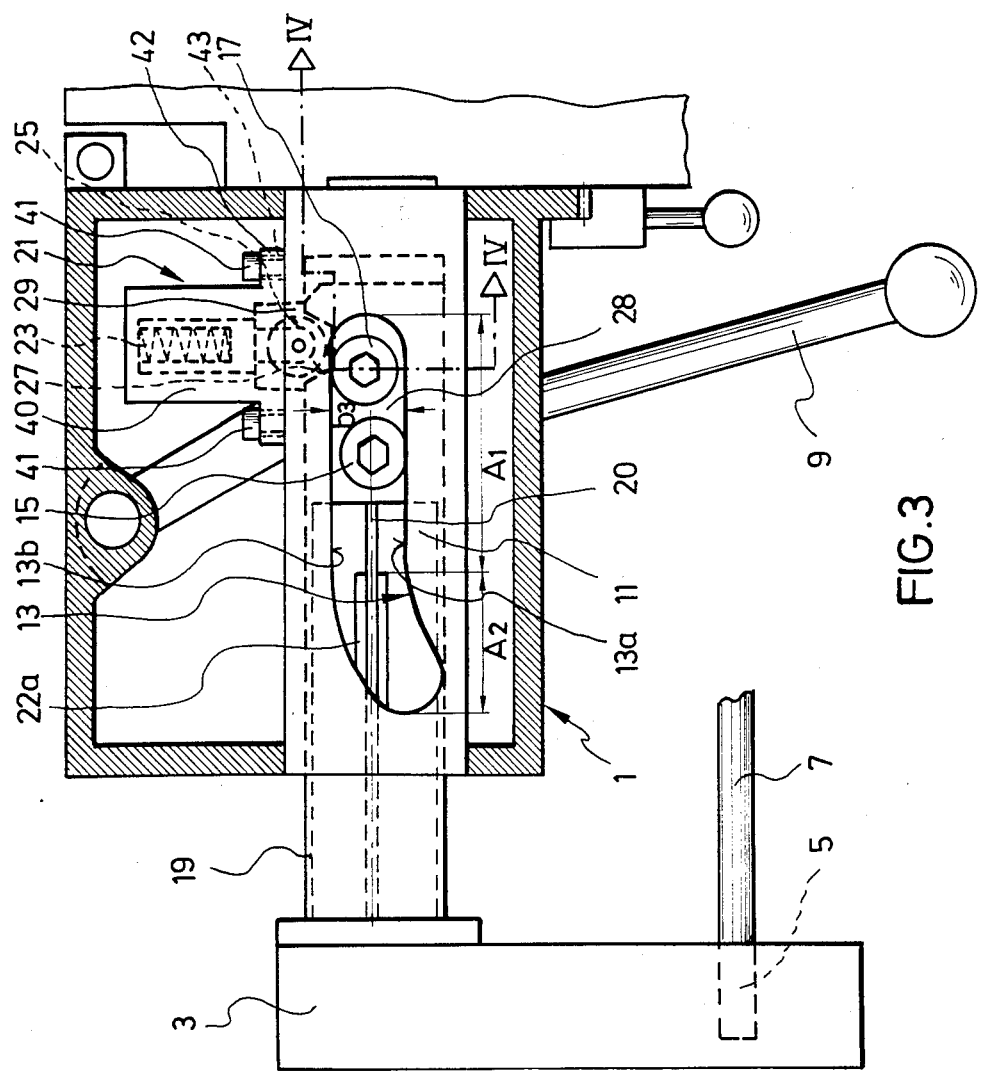
FIG. 3 shows a sectional view of the holding device along the line III—III of FIG. 1.

As can be seen from FIG. 3, the guide tube 11 is provided with a guide link 13 on the side which is positioned approximately opposite to the opening 35. Two guide elements 15 and 17 (cf. FIG. 4) are screwed into the solid part 28, said guide elements cooperating with the guide link 13. The guide elements 15 and 17 are constructed as rolls. The width $b_3$ of the guide link 13 is greater than the diameter of the rolls 15 and 17, respectively. When seen in the longitudinal direction, the rolls 15 and 17 are located one behind the other, but in the circumferential direction of the support tube 19 they are displaced relative to each other. The roll 15 cooperates with the guide edge 13a of the guide link 13 and the roll 17 cooperates with the opposite guide edge 13b. The rolls are adapted to be adjusted. As can be seen from the sectional view in FIG. 4, this is made possible e.g. due to the fact that the rolls 17 are secured to the solid end 28 with the aid of a bolt 37, which acts on the inner ring 17a of the roll via a washer 38. The bolt 37 is dimensioned such that it extends through the roll bearing means with a certain amount of radial play. This arrangement provides the possibility of bringing the bearing means into abutting contact with the respective associated guide edge prior to tightening of the bolt and the possibility of fixing said bearing means then by tightening of the bolt. When both rolls have been fixed in abutting contact with the respective associated guide edges in the manner described hereinbefore, the support tube is inevitably supported and guided without any rotational play.

In a first section $A_1$, the guide edges 13a and 13b extend parallel to the longitudinal axis of the support tube 19 so that, when displaced along said section, the support tube is guided without any rotational movement in a mere longitudinal displacement relative to the guide tube 11. In a second section $A_2$, the guide link 13 has a curved shape so that, when the rolls abut on this curved portion, a pivotal movement of the support tube 19 relative to the guide tube 11 will inevitably be effected. This has the effect that, in cases in which the pivotal movement is continued with the aid of the pivotable lever 9 until the section $A_1$ has been run through, the brake ring housing 3 is automatically pivoted away, by further movement of the lever 9 in the same plane, into the position shown in FIG. 1 by the broken line.

Due to the fact that the rolls and, consequently, the support tube are guided in the guide link in a manner free from play, it is achieved that, when the pivotable lever 9 is pivoted back, the once adjusted position of the brake ring housing relative to the free end 5 of the twist-off nozzle 7 is taken up accurately.

An arresting means 21 is flanged onto the guide tube 11 within the housing 6 so that the support tube 19 can be held and positioned accurately also in the axial direction of the twist-off nozzle 7. The arresting means 21 includes a pressure roll 25 which is acted upon in the radial direction of the support tube 19 with the aid of the pressure exerting spring 23. Through an opening 29 provided in the guide tube at an appropriate location, the pressure roll 25 extends into a trough-shaped or also V-shaped snap-in groove 27. This snap-in groove 27 is dimensioned such that the radial path of the pressure roll 25 is limited due to the fact that the roll comes into stopping contact with the two rising flanks of the trough 27 prior to reaching the bottom of the groove. When the support tube 19 takes up the position shown in FIGS. 2 and 3 (operating position of the brake ring housing), the pressure roll 25 automatically positions and fixes the support tube 19 in the longitudinal direction so that in this direction, too, the brake ring housing occupies precisely the position which has once been adjusted relative to the twist-off nozzle 7.

For the purpose of adjustment in the longitudinal direction, the spring 23 and the pressure roll 25 are accommodated in a roll holding means 40. The roll holding means is provided with a flange 42 having provided therein holes 43 through which screw bolts 41 extend. The diameter of the holes is dimensioned such that the screw bolts 41 extend through these holes with a certain amount of play so that the housing 40 and, consequently, also the pressure roll 25 are adapted to be displaced and adjusted in the axial direction of the guide tube. It follows that it is thus possible to exactly adjust the distance between the free end of the twist-off nozzle and the front surface of the brake ring housing, said distance being provided with reference sign A in FIG. 2.

This holding device can be used in practical operation as follows:

By releasing and adjusting the rolls 15 and 17 as well as the screws 41 for the pressure roll 25, it is first of all possible to adjust the brake ring housing 3 precisely in the axial direction as well as in the circumferential direction so that the brake ring housing 3 occupies a position relative to the twist-off nozzle 7 which is the respective optimum position for the sausage skin type and/or sausage meat type to be processed. When axial adjustment has been affected, the screws 41 are tightened. When the desired position perpendicular to the axial direction has been adjusted, the rolls 15 and 17, each of with is in abutting contact with the guide edge associated therewith, are fastened with screws and fixed. The brake ring housing 3 now occupies the aimed-at position relative to the twist-off nozzle 7. By taking hold of the lever 9, the brake ring housing can now be displaced first in the longitudinal direction and then, in a combined longitudinal and pivotal movement, away from the twist-off nozzle. The force required for pivoting is very small in view of the lever transmission between the shorter arm and the pivotable lever itself. This is also due to the distance obtained on the basis of the comparatively large distance between the bearing bolt 32 and the guide tube and the resultant flat configuration of the circular arc segment-shaped opening 35, which is concentric with said hearing bolt.

Due to the pivotal movement of the pivotable lever 9—which is to be carried out only in the horizontal plane—up to and into its end position, the brake ring housing is then automatically pivoted away. A caterpillar sausage skin can now be attached. By re-pivoting the pivotable lever 9 in the opposite direction, the once adjusted operating position is then inevitably readjusted due to the guidance which is effected free from play and also due to the axial securing. Shortly before this operating position is reached, the sliding roll 25 slides onto the bevel edge 44 (cf. FIG. 2) of the solid part of the support tube 19 and snaps then into the snap-in groove when the pivotal movement is being continued. This guarantees that in the axial direction, too, the adjusted position is re-established precisely.

In view of the fact that the pivotal movement of the lever 9 must be carried out in only one plane for longitudinally displacing as well as for pivoting away the brake ring housing, this pivotal movement can be carried out in a simple and uncomplicated manner by a fluent and, consequently, erogonomically advantageous movement of the hand.

Due to the solution described, it is additionally achieved that the brake ring housing is held in the operating position in a manner free from play, and, in addition, there is provided a possibility of setting and adjusting the brake ring housing precisely and without any difficult handling.

The actuation and guide elements in the case of this holding device are robust, space-saving and simple in construction. In particular, it is also possible to realize a large diameter of the support tube, and this, in turn, guarantees a stable positioning of the brake ring housing. The holding device as a whole is provided with a flat structural design. In particular, in spite of the long pivotable lever, no space below the holding device is required, so that a comparatively high work table can be positioned below the holding device and such tables permit simpler working than lower tables.

I claim:

1. A machine for filling sausage into an endless sausage skin and for twisting off individual sausages comprising a twist-off nozzle over which the sausage skin is fed, gear means for rotating the nozzle, a brake ring, a brake ring housing rotatably supporting the brake ring around the free end of the twist-off nozzle in its operating position, gear means in the housing for rotating the brake ring in synchronism with the speed of rotation of the twist-off nozzle, and displacement means for mounting said brake ring housing to the machine for movement of the brake ring toward and away from its operating position so that the free end of the nozzle is freely accessible, said displacement means comprising a guide tube mounted to the machine, a support tube connected to the brake ring housing and rotatably and slidably mounted in the guide tube, a guide plate mounted to the guide tube and having two opposed guiding edges, at least two guide elements adjustably mounted on the support tube so that one element is guided by one edge of the guide plate and the other element by the opposite guide edge so that the guide elements are guided by the guide plate in a play free manner, said guiding edges having a first section where movement of the guide elements along the edges carries out a first longitudinal displacement movement of the support tube relative to the guide tube and of the brake ring away from the nozzle and a second section where further movement of the guide elements along the edges carries out a combined longitudinal and pivotal movement of the support tube relative to the guide tube and of the brake ring relative to the nozzle, and a lever mounted to the machine and acting on the support tube for translating the guide elements along the edges of the guide plate.

2. The machine of claim 1, including an arresting means for releasably holding the support tube against longitudinal displacement when the brake ring is in the operating position.

3. The machine of claim 2, wherein the arresting means comprises a pressure roll acted upon by a spring and a complementary snap-in groove in the support tube engaged by the roll when the tube is in the operating position.

4. The machine of claim 3, wherein the pressure roll is arranged such that it is adapted to be displaced in the longitudinal direction.

5. The machine of claim 3 or 4, wherein the roll is held in a roll holding means and the holding means is mounted for longitudinal adjustment on the guide tube.

6. The machine of claim 1, wherein the guide elements are rollers rotatably mounted to the support tube.

7. The machine of claim 6, wherein the rollers are supported on a bearing bolt with adjustable eccentricity.

8. The machine of claim 7, wherein the lever is pivotally mounted to the machine and the guide tube has an opening in the shape of a circular arc segment that extends concentrically around the lever pivot and a link arm connected to the lever and pivotally connected to the support tube through said opening, whereby rotation of the lever about its pivot rotates the link arm and displaces the support tube relative to the guide tube.

9. The machine of claim 8, wherein the pivotable lever is mounted on the machine for rotation about an axis perpendicular to the axis of the guide and support tubes.

10. The machine of claim 8 or 9, wherein the pivotable lever pivots in a single plane.

11. The machine of claim 10, wherein the lever is approximately three times as long as the link arm.

12. The machine of claim 8, wherein the end of the link arm connected to the support tube carries a sliding roller which engages a groove that extends perpendicular to the longitudinal axis of the support tube.

13. The machine of claim 12, wherein the groove is broader than the sliding roller.

* * * * *